(12) United States Patent
Yu et al.

(10) Patent No.: US 11,693,981 B2
(45) Date of Patent: Jul. 4, 2023

(54) METHODS AND SYSTEMS FOR DATA SELF-PROTECTION

(71) Applicant: BicDroid Inc., Petersburg (CA)

(72) Inventors: Xiang Yu, Kitchener (CA); En-hui Yang, Petersburg (CA); Jin Meng, Kitchener (CA)

(73) Assignee: BICDROID INC., Petersburg (CA)

( * ) Notice: Subject to any disclaimer, the term of this patent is extended or adjusted under 35 U.S.C. 154(b) by 340 days.

(21) Appl. No.: 17/014,025

(22) Filed: Sep. 8, 2020

(65) Prior Publication Data

US 2021/0073407 A1 Mar. 11, 2021

Related U.S. Application Data

(60) Provisional application No. 62/897,482, filed on Sep. 9, 2019.

(51) Int. Cl.
*G06F 21/62* (2013.01)
*G06F 21/60* (2013.01)
(Continued)

(52) U.S. Cl.
CPC ...... *G06F 21/6218* (2013.01); *G06F 16/1734* (2019.01); *G06F 21/602* (2013.01); *G06F 21/604* (2013.01); *H04L 9/0618* (2013.01)

(58) Field of Classification Search
CPC .. G06F 21/6218; G06F 21/602; G06F 21/604; G06F 21/53; G06F 16/1734;
(Continued)

(56) References Cited

U.S. PATENT DOCUMENTS

| 9,703,979 | B1 | 7/2017 | Yang |
| 2005/0060537 | A1 | 3/2005 | Stamos et al. |

(Continued)

FOREIGN PATENT DOCUMENTS

CN 103124293 A 5/2013

OTHER PUBLICATIONS

International Search Report and Written Opinion dated Dec. 2, 2020 in respect of PCT/CA2020/051208.
(Continued)

*Primary Examiner* — Han Yang
(74) *Attorney, Agent, or Firm* — Bereskin & Parr LLP/S.E.N.C.R.L., s.r.l.

(57) ABSTRACT

Systems and method are provided for data self-protection. The systems and methods may involve installing a sentry on a computer system, the sentry including a file system filter installed on a kernel of that computer system; providing a central sentry platform in communication with the sentry, operating the central sentry platform to send a data self-protection policy to the sentry, the data self-protection policy being encrypted so that it can only be modified by the central sentry platform; operating the file system filter to control access to encrypted data stored on the computer system, by, for each process making a file access request to the encrypted data, the file system filter receiving and handling that file access request according to the data self-protection policy; and, operating the central sentry platform to monitor the sentry and to receive information from the sentry regarding access to the encrypted data.

28 Claims, 3 Drawing Sheets

(51) Int. Cl.
*H04L 9/06* (2006.01)
*G06F 16/17* (2019.01)

(58) Field of Classification Search
CPC ........... G06F 2221/2115; H04L 9/0618; H04L 9/0861; H04L 9/088
See application file for complete search history.

(56) References Cited

U.S. PATENT DOCUMENTS

| | | | |
|---|---|---|---|
| 2006/0184792 A1 | 8/2006 | Berlin | |
| 2006/0272024 A1* | 11/2006 | Huang | H04L 67/535 726/26 |
| 2008/0077971 A1* | 3/2008 | Wright | H04L 63/102 726/1 |
| 2008/0295174 A1* | 11/2008 | Fahmy | G06F 21/57 380/59 |
| 2009/0150970 A1 | 6/2009 | Hinds et al. | |
| 2015/0325106 A1* | 11/2015 | Dawes | H04L 12/2818 340/506 |
| 2018/0102902 A1* | 4/2018 | Yang | H04L 9/0618 |
| 2019/0080114 A1 | 3/2019 | Brown et al. | |

OTHER PUBLICATIONS

Wolthusen, "Security Policy Enforcement at the File System Level in the Windows NT Operating System Family", Proceedings of the Seventeenth Annual Computer Security Applications Conference, New Orleans, LA, USA, Dec. 10-14, 2001, 9 pages, Dec. 10, 2001.

Wu, "A Light-weight Kernel-level Mandatory Access Control Framework for Android", Proceedings of 2019 IEEE International Conference on Power, Intelligent Computing and Systems (ICPICS 2019), Shenyang, China, Jul. 12-14, 2019, pp. 353-358, Jul. 12, 2019.

Spencer et al., "The Flask security architecture: System support for diverse security policies", Proceedings of the 8th USENIX Security Symposium, Washington, D.C., USA, Aug. 23-26, 1999, pp. 123-139, Aug. 23, 1999.

\* cited by examiner

METHODS AND SYSTEMS FOR DATA SELF-PROTECTION

RELATED APPLICATIONS

This application claims the benefit of Provisional Application Ser. No. 62/897,482, filed Sep. 9, 2019, which is hereby incorporated herein by reference.

FIELD

The embodiments described herein generally relate to protecting data, and in particular, to systems and methods for data self-protection.

BACKGROUND

The following is not an admission that anything discussed below is part of the prior art or part of the common general knowledge of a person skilled in the art.

Cybersecurity is fundamental to a digital society and data is fundamental to an Internet-based economy. The core of cybersecurity is data safety in a complicated cyberspace. As the world becomes increasingly digital, activities rely more and more on data technologies. Breaches of critical data, such as core intellectual properties, can compromise national and economy security. Alteration and/or loss of critical data can change the course of business with severe consequences, shut down production lines, and negatively affect people's lives. As such, protecting data anytime against breaches and any known/unknown attacks is an urgent need for many industries.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with an aspect of this disclosure, there is provided a method of enabling data self-protection on at least one computer system. The method may involve installing a sentry on a computer system of the at least one computer system, the sentry includes a file system filter installed on a kernel of that computer system, the file system filter integrating mandatory access control and encryption together; providing a central sentry platform in electronic communication with the sentry installed on the computer system, the central sentry platform being separate from the kernel of the computer system; operating the central sentry platform to send a data self-protection policy to the sentry, the data self-protection policy being encrypted so that the data self-protection policy can only be modified by the central sentry platform; operating the file system filter to control access to encrypted data stored on the computer system, by, for each process making a file access request to the encrypted data, the file system filter receiving and handling that file access request according to the data self-protection policy to grant or deny that file access request; and, operating the central sentry platform to monitor the sentry and to receive information from the sentry regarding access to the encrypted data stored on the computer system.

In some embodiments, the at least one computer system may include a plurality of computers; installing the sentry may involve installing a plurality of sentries including, for each computer in the plurality of computers, installing a corresponding sentry on that computer, installing that corresponding sentry on that computer may involve installing the file system filter of that corresponding sentry on the kernel of that computer; providing the central sentry platform may involve providing the central sentry platform on a computer system in electronic communication with the plurality of sentries; operating the central sentry platform to send the data self-protection policy may involve operating the central sentry platform to send a plurality of data self-protection policies including, for each sentry in the plurality of sentries, sending a corresponding data self-protection policy to that sentry; operating the file system filter to control access to encrypted data stored on the computer system, may involve, for each computer in the plurality of computers, operating the file system filter of the corresponding sentry installed on that computer to control access to the encrypted data stored on that computer according to the corresponding data self-protection policy sent to the corresponding sentry; and, operating the central sentry platform to monitor the sentry may involve, for each computer in the plurality of computers, operating the central sentry platform to monitor the corresponding sentry on that computer to receive information from that sentry regarding access to the encrypted data stored on that computer.

In some embodiments, for each computer in the plurality of computers, operating the file system filter of the corresponding sentry installed on that computer may further involve operating the file system filter to examine each access request made by each process to access the encrypted data stored on that computer according to the corresponding data self-protection policy sent to that sentry by granting the access request and decrypting the encrypted data if plaintext access is allowed by the corresponding data self-protection policy, granting the access request without decrypting the encrypted data if cipher-text access is allowed by the corresponding data self-protection policy, or denying the access request if neither plaintext access nor cipher-text access is allowed by the corresponding data self-protection policy; and operating the central sentry platform to monitor each sentry in the plurality of sentries to receive information from that sentry may further involve monitoring each sentry to receive information on all examined access requests from that sentry.

In some embodiments, the information on all examined access requests may include, for each access request made by each process on each computer in the plurality of computers, the information of that computer, the information of that process including its application program, the file information of the encrypted data, the time of access attempt associated with that access request, and the examination result made by the corresponding sentry on that computer.

In some embodiments, the method may further involve for each computer in the plurality of computers, operating the corresponding sentry installed on that computer to monitor operational aspects of that computer in addition to examining all access requests to access the encrypted data stored on that computer; for each computer in the plurality of computers, operating the central sentry platform to monitor each sentry may further involve operating the central sentry platform to receive information from that sentry regarding the operational aspects of that computer.

In some embodiments, for each computer in the plurality of computers, the operational aspects of that computer may include, for a plurality of resources of that computer, the current usage level of each resource in the plurality of resources relative to the total capacity of that resource on that computer; the plurality of resources may include a memory, a processor and disk space of that computer.

In some embodiments, for each computer in the plurality of computers, the data self-protection policy sent to the corresponding sentry installed on that computer may include a plaintext authorization list of all legitimate application programs having processes authorized to access plaintext content of the encrypted data, and a cipher-text authorization list of all legitimate application programs having processes authorized to access cypher-text content of encrypted data; for each access request to access the encrypted data, the file system filter of that sentry may determine plaintext access is allowed when the process making the access request is authenticated by that sentry as a process of a legitimate application program listed on the plaintext authorization list, cipher-text access is allowed when the process making the access request is authenticated by that sentry as a process of a legitimate application program listed on the cipher-text authorization list, and otherwise neither plaintext access nor cipher-text access is allowed.

In some embodiments, for each computer in the plurality of computers, installing the corresponding sentry on that computer may further involve installing a sentry application of that sentry on a user space of that computer, the user space being separate from the kernel space of that computer, the sentry application of that sentry being linked for communication with the file system filter of that sentry; and, providing a plurality of communication channels, the plurality of communication channels may include, for each computer in the plurality of computers, a communication channel linking the central sentry platform to the file system filter of the sentry for that computer via the sentry application of the sentry for that computer.

In some embodiments, the method may further involve, for each sentry in the plurality of sentries, defining a heartbeat frequency; operating that sentry to send a time series of heartbeats to the central sentry platform at a heartbeat frequency via the communication channel linking the central sentry platform to the file system filter of that sentry, the time series of heartbeats being encrypted so that the time series of heartbeats can only be modified by that sentry; monitoring the time series of heartbeats; and, based at least partly on the monitoring the time series of heartbeats, operating the central sentry platform to evaluate the status of that sentry.

In some embodiments, the method may further involve providing a visualization display, associated with the central sentry platform, to display a plurality of access status indicators for indicating and displaying the information on all examined access requests received from the plurality of sentries.

In some embodiments, providing the visualization display may involve providing on the visualization display a plurality of computer representations including, for each computer in the plurality of computers, a corresponding computer representation for representing that computer; and, for each computer representation provided on the visualization display, providing in association with that computer representation, at least one access status indicator in the plurality of access status indicators to display and indicate at least partial information on all examined access requests received from the corresponding sentry on the computer represented by that computer representation.

In some embodiments, the method may further involve providing a visualization display, associated with the central sentry platform, to display a plurality of operational status indicators for indicating and displaying the operational aspects received from the plurality of sentries.

In some embodiments, providing the visualization display may involve providing on the visualization display a plurality of computer representations including for each computer in the plurality of computers, a corresponding computer representation for representing that computer; and for each computer representation provided on the visualization display, providing in association with that computer representation, at least one operational status indicator in the plurality of operational status indicators to display and indicate at least one operational aspect received from the corresponding sentry on the computer represented by that computer representation.

In some embodiments, the method may further involve providing at the central sentry platform a dynamic search function for searching items contained in the information on all examined access requests received from the plurality of sentries.

In accordance with an aspect of this disclosure, there is provided a system for enabling data self-protection. The system may include at least one computer system, a computer system of the at least one computer system has a sentry installed thereon, the sentry including a file system filter installed on a kernel of that computer system, the file system filter integrating mandatory access control and encryption together; and a central sentry platform in electronic communication with the sentry installed on the computer system, the central sentry platform being separate from the kernel of the computer system. In operation, the central sentry platform may send a data self-protection policy to the sentry, the data self-protection policy being encrypted so that the data self-protection policy can only be modified by the central sentry platform; the file system filter may control access to encrypted data stored on the computer system, by, for each process making a file access request to the encrypted data, the file system filter receiving and handling that file access request according to the data self-protection policy to grant or deny that file access request; the central sentry platform may monitor the sentry and receive information from the sentry regarding access to the encrypted data stored on the computer system.

In some embodiments, the at least one computer system may include a plurality of computers; each computer in the plurality of computers may have a corresponding sentry installed thereon, the file system filter of that corresponding sentry may be installed on the kernel of that computer; the central sentry platform may be provided on a computer system in electronic communication with the plurality of sentries; the central sentry platform may be operable to send a plurality of data self-protection policies including, for each sentry in the plurality of sentries, a corresponding data self-protection policy for that sentry; for each computer in the plurality of computers, the file system filter of the corresponding sentry installed on that computer may be operable to control access to the encrypted data stored on that computer according to the corresponding data self-protection policy sent to the corresponding sentry; and, the central sentry platform may be operable to, for each computer in the plurality of computers, monitor the corresponding sentry on that computer to receive information from that sentry regarding access to the encrypted data stored on that computer.

In some embodiments, for each computer in the plurality of computers, the file system filter of the corresponding sentry installed on that computer may be operable to examine each access request made by each process to access the encrypted data stored on that computer according to the corresponding data self-protection policy sent to that sentry by granting the access request and decrypting the encrypted data if plaintext access is allowed by the corresponding data self-protection policy, granting the access request without decrypting the encrypted data if cipher-text access is allowed by the corresponding data self-protection policy, or denying the access request if neither plaintext access nor cipher-text access is allowed by the corresponding data self-protection policy; and the central sentry platform may be operable to monitor each sentry to receive information on all examined access requests from that sentry.

In some embodiments, the information on all examined access requests may include, for each access request made by each process on each computer in the plurality of computers, the information of that computer, the information of that process including its application program, the file information of the encrypted data, the time of access attempt associated with that access request, and the examination result made by the corresponding sentry on that computer.

In some embodiments, for each computer in the plurality of computers, the corresponding sentry installed on that computer may be operable to monitor operational aspects of that computer in addition to examining all access requests to access the encrypted data stored on that computer; and the central sentry platform may be operable to, for each computer in the plurality of computers, receive information from the corresponding sentry regarding the operational aspects of that computer.

In some embodiments, for each computer in the plurality of computers, the operational aspects of that computer may include, for a plurality of resources of that computer, the current usage level of each resource in the plurality of resources relative to the total capacity of that resource on that computer; the plurality of resources may include a memory, a processor and disk space of that computer.

In some embodiments, for each computer in the plurality of computers, the data self-protection policy sent to the corresponding sentry installed on that computer may include a plaintext authorization list of all legitimate application programs having processes authorized to access plaintext content of the encrypted data, and a cipher-text authorization list of all legitimate application programs having processes authorized to access cypher-text content of encrypted data; for each file access request to access the encrypted data, the file system filter of that sentry may determine plaintext access is allowed when the process making the access request is authenticated by that sentry as a process of a legitimate application program listed on the plaintext authorization list, cipher-text access is allowed when the process making the access request is authenticated by the sentry as a process of a legitimate application program listed on the cipher-text authorization list, and otherwise neither plaintext nor cipher-text access is allowed.

In some embodiments, for each computer in the plurality of computers, a sentry application of that sentry may be installed on a user space of that computer, the user space being separate from the kernel space of that computer, the sentry application of that sentry being linked for communication with the file system filter of that sentry; and, the system may further include a plurality of communication channels, the plurality of communication channels may include, for each computer in the plurality of computers, a communication channel linking the central sentry platform to the file system filter of the sentry for that computer via the sentry application of the sentry for that computer.

In some embodiments, for each sentry in the plurality of sentries, the sentry may be operable to send a time series of heartbeats to the central sentry platform at a heartbeat frequency via the communication channel linking the central sentry platform to the file system filter of that sentry, the time series of heartbeats being encrypted so that the time series of heartbeats can only be modified by that sentry; the central sentry platform may be operable to monitor the time series of heartbeats; and, the central sentry platform may be operable to, based at least partly on the monitoring the time series of heartbeats, evaluate the status of that sentry.

In some embodiments, the central sentry platform may be operable to provide a visualization display to display a plurality of access status indicators for indicating and displaying the information on all examined access requests received from the plurality of sentries.

In some embodiments, providing the visualization display may involve providing on the visualization display a plurality of computer representations including, for each computer in the plurality of computers, a corresponding computer representation for representing that computer; and, for each computer representation provided on the visualization display, providing in association with that computer representation, at least one access status indicator in the plurality of access status indicators to display and indicate at least partial information on all examined access requests received from the corresponding sentry on the computer represented by that computer representation.

In some embodiments, the central sentry platform may be operable to provide a visualization display to display a plurality of operational status indicators for indicating and displaying the operational aspects received from the plurality of sentries.

In some embodiments, providing the visualization display may involve providing on the visualization display a plurality of computer representations including for each computer in the plurality of computers, a corresponding computer representation for representing that computer; and, for each computer representation provided on the visualization display, providing in association with that computer representation, at least one operational status indicator in the plurality of operational status indicators to display and indicate at least one operational aspect received from the corresponding sentry on the computer represented by that computer representation.

In some embodiments, the central sentry platform may be operable to provide a dynamic search function for searching items contained in the information on all examined access requests received from the plurality of sentries.

BRIEF DESCRIPTION OF DRAWINGS

For a better understanding of the described embodiments and to show more clearly how they may be carried into effect, reference will now be made, by way of example, to the accompanying drawings in which.

Figure 1:
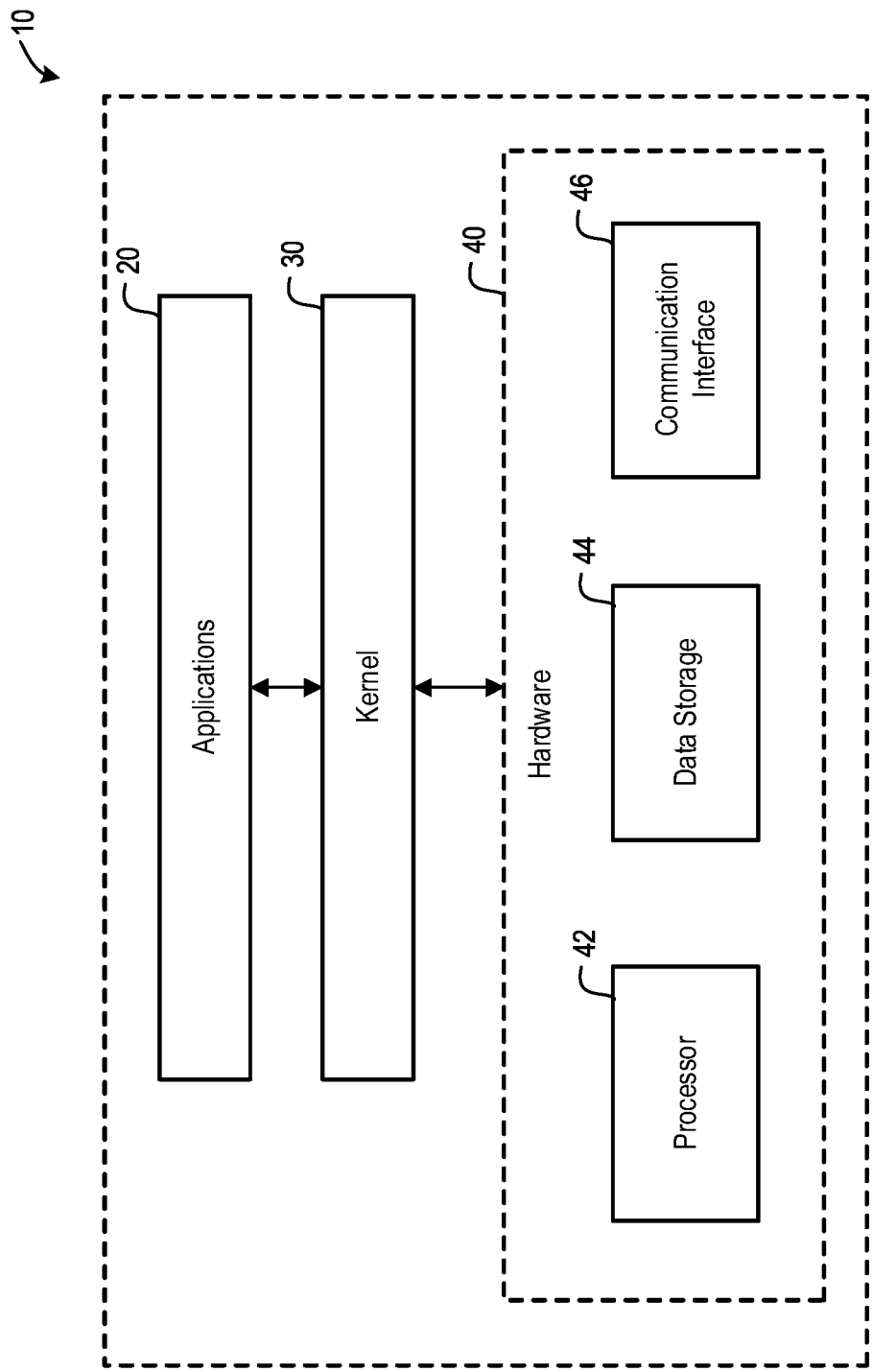
FIG. 1 is a block diagram of an example computer system, in accordance with an embodiment.

The drawings, described below, are provided for purposes of illustration, and not of limitation, of the aspects and features of various examples of embodiments described herein. For simplicity and clarity of illustration, elements

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the drawings and the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Aspects of embodiments of the systems and methods described herein may be implemented in hardware or software, or a combination of both. Aspects of these embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smart-phone device, tablet computer, a wireless device or any other computing device capable of being configured to carry out aspects of the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information may be applied to one or more output devices, in known fashion. Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Aspects of embodiments of the system may also be considered to be implemented as a non-transitory computer-readable storage medium, configured with a computer program, where the storage medium so configured causes a computer to operate in a specific and predefined manner to perform the functions described herein.

Furthermore, aspects of the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

It should be noted that the term application is meant to be a shorter form of application program, which refers to a computer program that is designed to realize a specific function for an end user. Thus, from an end user's perspective, a program in the computer system is usually referred to as an application. For example, an end user usually refers to the Microsoft Windows Word as an application of word processing, while in the operating system, the program is winword.exe.

Many computer security technologies have been proposed, including firewalls, role-based access controls, data backup services, data encryption, etc. In addition, best practice and enforcement of regulation and policy have also been recommended. Firewall technology aims to prevent malware from getting into a computer system. Role-based access control restricts system access rights to authorized users, based on the roles and privileges of those users. Data backup archives data according to a predetermined schedule to prevent data loss. Encryption encodes a plaintext file into a form which is not recognizable, unless decrypted with the corresponding decryption key.

Although the above computer security technologies may work to some extent, they can all be vulnerable to sophisticated attacks, as evidenced by that the fact that 90% of all large institutions had data breaches and/or were held for ransom over the past 12 months. In today's interconnected cyber-physical-human networks, computer security is only as strong as the weakest link at the weakest moment. Since it is hard for humans to remain vigilant around the clock, malware can find ways, through sophisticated known or unknown attacks exploiting the weakest link and moment, into a computer network. Once malware is inside a computer network, various network technologies can all fail.

Malware scanning and detection technologies face a challenge of uncertainty coming from unknown attacks, while imposing a big computational burden to the protected systems. The inventors have developed methods and systems that can protect data from a data-centric perspective to guard data actively and effectively.

Described herein are various embodiments of systems, methods, computer program products, and devices for providing edge security, data self-protection, and central monitoring and management. In general, the embodiments described herein provide data self-protection with encryption and process-based access policing via a kernel file system filter as a data security sentry. The sentries are built upon process-based access policing, where authorized processes are granted desired access to encrypted data, while unauthorized processes, such as malware, are denied of any access to the encrypted data. The sentries can connect with a central sentry platform for data analysis and visualization, as well as central monitoring and management. The embodiments described herein can protect data against data breaches and known and unknown attacks, including ransomware and phishing attacks.

Embodiments described herein can provide a process-based encrypted data access policing system. The system may include a data storage for storing encrypted data, a file system filter, and a sentry application. The file system filter can operate as an interface between data stored in the data storage and various applications trying to access the data. The file system filter can encrypt data, decrypt data, police application processes trying to access data, authenticate processes, and authorize them accordingly. Embodiments described herein may also involve kernel level process authentication and authorization in the process-based encrypted data access policing system. In particular, embodiments described herein may be used to police processes trying to access encrypted data, authenticate processes, grant plaintext content access only to processes authorized for accessing the plaintext, grant cypher-text content access only to processes authorized for accessing the cypher-text, and decline access requests for all unauthorized processes. The process authentication and authorization procedure may include three stages:

1. Configuration: The access permission for each of allowed legitimate processes can first be determined. A data self-protection policy between allowed legitimate processes and their corresponding access permissions can then be provided to the kernel level file system filter.
2. Process authentication: The genuine identity of a calling process can be checked and compared with those on the data self-protection policy.
3. Process authorization: The access permission granted to the authenticated calling process can be checked according to the data self-protection policy, and authorized accordingly.

Referring now to FIG. 1, there is shown an example computer system 10, in accordance with an embodiment. The computer system 10 can include hardware components 40, such as a processor 42, a data storage 44, and a communication interface 46. The computer system 10 can execute, using the hardware 40, various software, such as a kernel 30 and applications 20. In some embodiments, the computer system 10 can be a server configured to provide services to other computer systems.

The processor 42 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the computer system 10. The processor 42 can include more than one processor with each processor being configured to perform different dedicated tasks. The processor 42 can execute instructions to run various software stored in the data storage 44, such as the application programs 20 and the kernel 30.

The data storage 44 can include RAM, ROM, one or more hard drives, one or more flash drives or some other suitable data storage elements such as disk drives, direct-attached storage, network-attached storage, and storage area network. The data storage 44 can be used to store various computer programs, such as the kernel 30 and the applications 20. The data storage 44 can include volatile and non-volatile memory. During operation, computer programs stored in the non-volatile memory can be loaded onto the volatile memory for rapid access by the processor 42.

The communication interface 46 can include any interface that enables the computer system 10 to communicate with various devices and other systems. For example, the communication interface 46 can include at least one of a serial port, a parallel port or a USB port, in some embodiments. The communication interface 46 may also include an interface to component via one or more of an Internet, Local Area Network (LAN), Ethernet, Firewire, modem, fiber, digital subscriber line connection, or other network. Various combinations of these elements may be incorporated within the communication interface 46. For example, the communication interface 46 may receive input from various input devices, such as a mouse, a keyboard, a touch screen, a thumbwheel, a track-pad, a track-ball, a card-reader, voice recognition software and the like, depending on the requirements and implementation of the computer system 10.

The applications 20 can be any computer programs that can be executed by the computer system 10. The applications 20 can be used by the users to interact with the computer system 10. For example, the applications 20 may include a word processor, a spreadsheet program, a web browser, a media player, a file viewer, a photo editor, etc. The applications 20 generally cannot access the hardware components 40 directly. Instead, access to the hardware components 40 is typically provided through the kernel 30. That is, the kernel 30 can control the interactions between the applications 20 and the hardware 40. The kernel 30 is generally responsible for managing the hardware components 40 and is typically a subcomponent of the operating system of the computer system 10. In other words, the kernel 30 can allocate the hardware resources 40 to execute the applications 20. For example, the kernel 30 may perform memory, CPU, and device management, file management, and system calls management. The applications 20 typically must issue system calls to the kernel 30 to access the hardware resources 40, such as file reading/writing.

During operation, the kernel 30 and the applications 20 can be loaded by the data storage 44 for access and execution by the processor 42. The kernel 30 can be loaded on a separate, protected portion of the data storage 44 from the applications 20. The portion of the data storage 44 on which the kernel 30 is loaded can be protected from access by the applications 20, and, in some cases, other components of the operating system. Accordingly, the data storage 44 can be segregated into a kernel space for loading the kernel 30 and a user space for loading the applications 20. The user space may include all portions of the data storage 44 other than the kernel 30.

Figure 2:
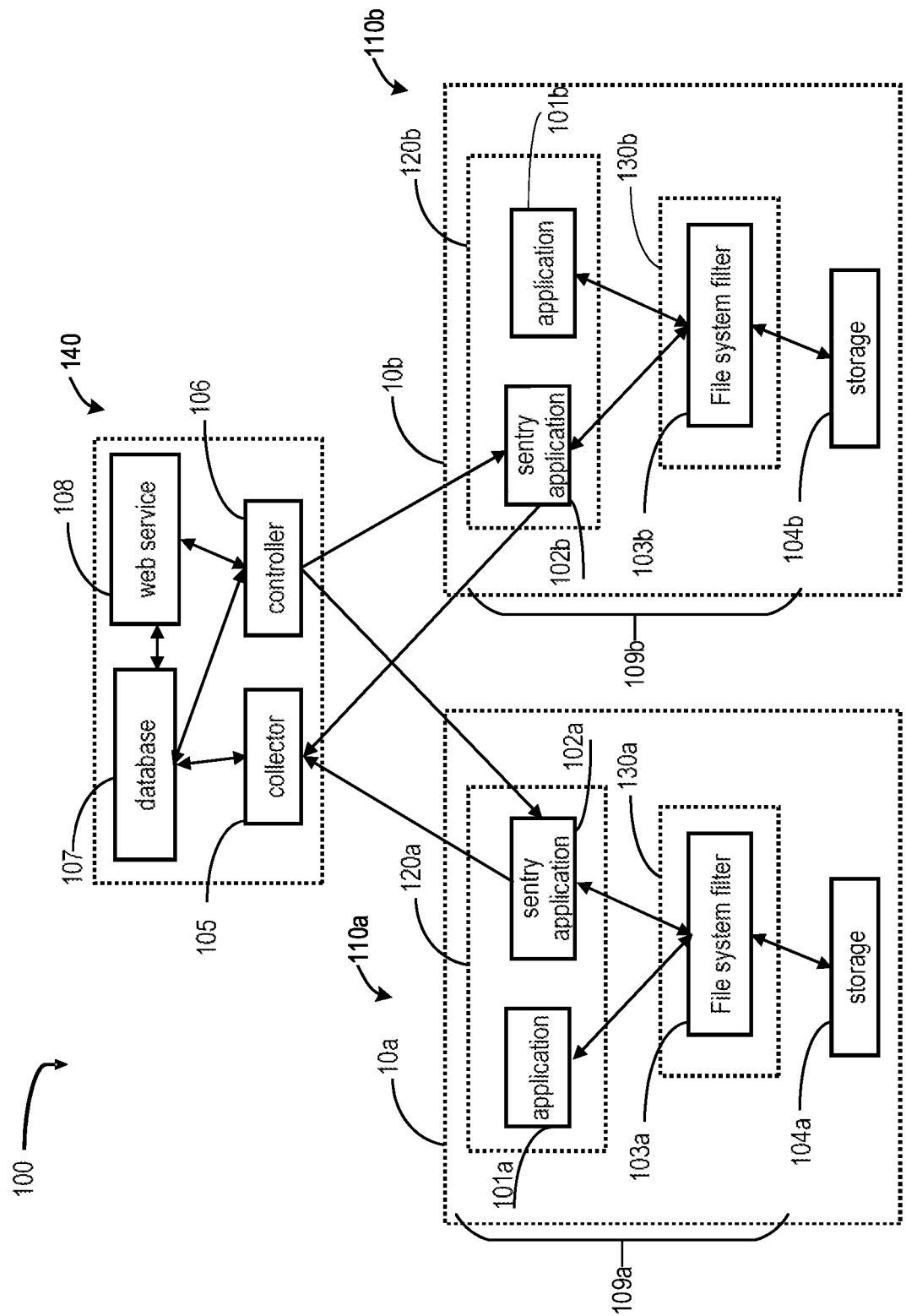
FIG. 2 is a block diagram of an example system for enabling data self-protection, in accordance with an embodiment.

Referring now to FIG. 2, shown therein is an example system 100 for data self-protection, in accordance with some embodiments. The data self-protection system 100 can provide process-based encrypted data access policing. In some embodiments, the data self-protection system 100 may provide a data protection solution that safeguards data stored on a computer system against data breaches and any known and unknown attacks, including phishing and ransomware attacks, while seamlessly supporting various types of services such as SharePoint, Exchange, SQL, Perforce, Web servers, etc. to access the encrypted and protected data transparently. In some embodiments, the system 100 can provide a data self-protection solution at the file system level on an endpoint computer system against data breaches and any known and unknown attacks, including phishing and ransomware attacks, while allowing a legitimate end user to access the protected data in a transparent way.

The data self-protection system 100 includes a central sentry platform 140 and at least sentry 110. Although only two sentries 110a and 110b are shown in the illustrated example, it should be appreciated that the data self-protection system 100 can include any number of sentries 110. The central sentry platform 140 and the at least one sentry 110 are installed on one or more computer systems 10. Each sentry 110 is generally installed on a separate computer system 10 and is operable to protect data stored on that computer system 10 using integrated combinations of encryption and process-based access control. For example, the data self-protection system 100 may include a plurality of computer systems 10, each having a sentry 110 installed thereon. In the illustrated example, a first sentry 110a is installed on a first computer system 10a, and a second sentry 110b is installed on a second computer system 10b. The central sentry platform 140 is generally in electronic communication with each sentry 110 and is operable to monitor and manage each sentry 110. The central sentry platform 140 may be installed on the same computer system 10 as a sentry 110, or a separate computer system 10 altogether. In some embodiments, the data self-protection system 100 may include only one computer system 10 on which both the central sentry platform 140 and the sentry 110 are installed.

In various embodiments, the data self-protection system 100 can be provided by a plurality of computer systems 10 connected through one or more networks. The network(s) can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the computer systems 10. The network(s) may be local, private, public (e.g., the Internet), or a combination thereof. In some embodiments, the central sentry platform 140 and the sentries 110 may be installed on a plurality of computer systems 10 that are all on the same private network. In other embodiments, the central sentry platform 140 may be installed on a cloud computer, while the sentries 110 are installed on computer systems 10 within a private network.

Each computer system 10 can store data that can be protected by a sentry 110 installed thereon. For example, each computer system 10 can include a first data storage 104 for storing data that can be access-controlled and encrypted by the respective sentry 110. In various embodiments, the first data storage 104 can be a non-volatile storage, such as, hard-disks, network-disks, USB drive, CD drive, SD cards, direct-attached storage, network-attached storage, and storage area network, etc.

Each computer system 10 can also run various computer programs, such as applications 101. For example, each computer system 10 can include a second data storage 109 for loading the applications 101. In various embodiments, the second data storage 109 can be a volatile storage, such as random-access memory (RAM). The second data storage 109 can include a user space 120 and a kernel 130 that is separate from the user space 120. As described above, the kernel 130 can be a protected portion of the data storage 109 that is separate from the user space 120 (and the applications 101). At least a portion of the sentry 110 can be installed within the kernel 130. However, it should be appreciated that the central sentry platform 140 is separate from the kernel 130.

Each sentry 110 can include a file system filter 103 and a sentry application 102. The file system filter 103 can be installed on the kernel 130 of the computer system 10. The file system filter 103 can integrate mandatory access control and encryption together to protect the protected data stored on the computer system 10. That is, the file system filter 103 can encrypt and control access to the protected data stored on the computer system 10. The sentry application 102 can be installed in the user space 120 of the computer system. The sentry application 102 can facilitate communication between the central sentry platform 140 and the file system filter 103. For example, a plurality of communication channels can link the central sentry platform 140 to the file system filter 103 of each sentry 110 via the respective sentry application 102.

During the operation, each computer system 10 having a sentry 110 installed thereon can run various applications 101 as one or more processes. The processes are the actual execution of the application 101. The applications 101 can be stored on the computer system 10 as a file and loaded into the user space 120 through a system call to the kernel 130 to generate a process. The process can be associated with a process ID that can be used to identify the process in the kernel 130.

As the applications 101 are executed, the processes may request access to the encrypted data protected by the sentry 110. Generally, when a process wants to access a file, the process issues a request for obtaining a reference to this file (called a file handle) to the file system. Depending on the property of the request and whether the file to be accessed exists, a new file could be created or an existing file could be opened. After a file handle to the file is obtained by the process, the process can write data into the file by passing the file handle and the data to be written to the file system, and can read data from the file by passing the file handle and the place to hold the data to be read to the file system. When the process does not need to access the file anymore, the process issues a request for closing the file handle to the file system. The file system filter 103 can intercept the requests for obtaining file handles, writing and reading data, and closing file handles that are issued by the process.

The file system filter 103 can receive the access requests and handle the requests according to a data self-protection policy to either grant or deny the requests. For example, the file system filter 103 can examine each access request made by each process and grant the access request and decrypt the encrypted data if plaintext access is allowed by the data self-protection policy; grant access to the access request without decrypting the encrypted data if cipher-text access is allowed by the data self-protection policy; or deny the access request if neither plaintext access nor cipher-text access is allowed by the data self-protection policy. The file system filter 103 can also send information associated with each examined access request to the central sentry platform 140 through the sentry application 102.

The data self-protection policy can define a particular level of access for each process. In various embodiments, the level of access can be defined based on the application 101 associated with the process. Accordingly, all processes executing a particular application 101 may have the same access permission. For example, the data self-protection policy may include a plaintext authorization list of all legitimate application programs having processes authorized to access the plaintext content of the encrypted data, and a cipher-text authorization list of all legitimate programs having processes authorized to access cipher-text content of the encrypted data. The file system filter 103 can determine whether the process making the access request is a legitimate application program listed on the plaintext authorization list or the cipher-text authorization list to determine whether to grant the request, and whether to decrypt the encrypted data. Example processes authorized to access the plaintext content may include Windows Word for a doc file, Acrobat Reader/Writer for a pdf file, Notepad for a text file, Virtual Studio for C/C++ files, and so on. Processes authorized to access the cipher-text content may include file synchronization applications, such as Dropbox, OneDrive, Google Drive, etc. Synchronization applications may be granted access to the cypher-text so that they only synchronize the cypher-text of an encrypted data file (and plaintext of an encrypted data) to the cloud. Processes that are authorized to access neither the plaintext content nor the cipher-text content may include processes that are not examined by the end user. In various embodiments, processes associated with the sentry application 102 may not have any type of access permission to the protected files, because the sentry application 102 may not need to access the encrypted data files. In some embodiments, the lists may be a linked list data structure.

The data self-protection policy is typically provided to each sentry 110 by the central sentry platform 140. The data self-protection policy may be the same for each sentry 110, or may differ based on the particular sentry 110. The data self-protection policy can be encrypted so that it can only be modified by the central sentry platform 140. The encryption may prevent a local user with root, administrative, or supervisor level access to the computer system 10 from modifying the data self-protection policy. In some embodiments, the central sentry platform 140 can send an initial data self-protection policy to a sentry 110, and then subsequently send modifications to the data self-protection policy. In some embodiments, the data self-protection policy may be referred to as a configuration map.

In some embodiments, the file system filter 103 may use a directory tree to determine whether a particular file stored in the computer system 10 is encrypted. A fast string search algorithm may be used to quickly search the directory tree based on the tree structure of the file system path strings. In some embodiments, the search tree may be initiated when the file system filter 103 is loaded, and built up by detecting, for each file, whether it is encrypted, when the file is accessed by the file system filter 103 for the first time, such as when invoked by any process or application. The data self-protection system 100 may detect whether a file is encrypted in various ways. In some embodiments, detecting whether a file is encrypted can involve appending a special extension name to encrypted data files stored on the data storage 104. Detecting whether a file is encrypted may then be carried out by checking the existence of the special extension name. In some embodiments, detecting whether a file is encrypted may involve embedding an encryption token into the file header of an encrypted data file to indicate that the file is encrypted, and then using the token information for the detection. In some embodiments, detecting whether a file is encrypted may involve using the file attribute domain in the file system, recording a sign for encryption for encrypted data files, and using the sign for detection.

In some embodiments, an encryption or decryption key can be generated so that the file system filter 103 can encrypt or decrypt data stored on the computer system 10. The generated key can be applied to encrypt/decrypt data in a buffer for file reading/writing. The encryption key and the corresponding decryption key may be the same if symmetric encryption is applied.

In some embodiments, generating the encryption key can involve generating the encryption key based on input data in a deterministic manner, i.e. the output (encryption key) is the same as long as input data is the same. The input data may include two parts: a unique identifier of a keystore seed and auxiliary information called keying material. Given a unique identifier of a keystore seed and the keying material, the method for key generation may use the identifier to determine a keystore seed and then combine the keystore seed and the keying material to generate an encryption key. Examples of methods for key generation are described in greater detail in the Applicant's U.S. Pat. No. 9,703,979, filed on Jun. 10, 2016, and entitled "METHODS AND COMPUTER PROGRAM PRODUCTS FOR ENCRYP- TION KEY GENERATION AND MANAGEMENT", the entirety of which is hereby incorporated by reference.

In some embodiments, a hash map (thereafter called encryption key cache) between identifiers of files and encryption keys can be maintained in the memory of the computer system 10, allowing the file system filter 103 to efficiently record or retrieve an encryption key for a file. The hash map may be initiated when the file system filter 103 is loaded, and be built up by recording a pair of an identifier of a file and an encryption key when this encryption key is generated for a particular file.

In some embodiments, encryption key generation and caching may involve the user-mode sentry application 102 and the file system filter 103. Upon receiving a request for obtaining a file handle to a file that results in creating a new encrypted data file, the file system filter 103 may retrieve some properties of the encrypted data file (for example, the location where the file is to be created in the file system) and transmit the properties to the user-mode sentry application 102. Based on the properties, the user-mode sentry application 102 can determine a keystore seed having a unique identifier, randomly generate a keying material, and then generate an encryption key using the selected keystore seed and the keying material. The user-mode sentry application 102 can then transmit the unique identifier of the selected keystore seed, the keying material, and the encryption key to the file system filter 103. The filter 103 can then record the keying material together with the unique identifier of the selected keystore seed in the encrypted data file. The filter 103 can further record a pair of a unique identifier of the file and the encryption key in the encryption key cache.

In some embodiments, upon receiving a request for obtaining a file handle to an existing encrypted data file, the file system filter 103 may retrieve a unique identifier from the file and attempt to retrieve the corresponding encryption key in the encryption key cache through the unique identifier. When the encryption key cache does not contain the encryption key for this file, the filter 103 may retrieve the unique identifier of the keystore seed and the keying material stored in the encrypted data file, and then transmit the unique identifier of the keystore seed and the keying material to the user-mode sentry application 102. In turn, the user-mode sentry application 102 can then retrieve the keystore seed by the unique identifier, generate the encryption key for the encrypted data file using the keystore seed and the keying material, and transmit the encryption key to the filter 103. The filter 103 can further record a pair of a unique identifier of the file and the encryption key in the encryption key cache.

In some embodiments, encryption key generation and caching may involve only the file system filter 103 (and not the sentry application 102). For example, upon receiving a request for obtaining a file handle to a file that results in creating a new encrypted data file, the file system filter 103 may determine a keystore seed having a unique identifier. The filter 103 can further randomly generate a keying material, generate an encryption key using the keystore seed and the keying material, and then record the keying material together with the unique identifier of the keystore seed in the encrypted data file. The filter 103 can further record a pair of a unique identifier of the file and the encryption key in the encryption key cache.

In some embodiments, upon receiving a request for obtaining a file handle to an existing encrypted data file, the file system filter 103 may retrieve a unique identifier from the file and attempt to retrieve the corresponding encryption key in the encryption cache by the unique identifier. When the encryption key cache does not contain the encryption key for this file, the filter 103 may retrieve the unique identifier of the keystore seed and the keying material stored in the encrypted data file, retrieve the keystore seed by the unique identifier, and generate the encryption key using the keystore seed and the keying material. The filter 103 can further record a pair of a unique identifier of the file and the encryption key in the encryption key cache.

In some embodiments, a single keystore seed with its identifier can be loaded into the memory when the file system filter 103 is loaded. The filter 103 can use this keystore seed along with random keying materials to generate encryption keys for files to be created or opened. However, keying materials, which are randomly generated for files to be created or read from files to be opened, may be different for from one file to another.

In some embodiments, upon receiving a request for writing data into a file or reading data from an encrypted data file, the file system filter 103 can retrieve a unique identifier of the file, obtain an encryption key in the encryption key cache by the identifier, and use the encryption key to encrypt or decrypt data before the data is written into the file system or read by the authorized process that issues the reading request.

In some embodiments, after all file handles to a file are closed, the encryption key for this file may be purged from the encryption key cache.

In some embodiments, one encryption key can be loaded into the memory when the file system filter 103 is loaded. For all encrypted data files, the file system filter 103 can use the encryption key to encrypt or decrypt data before the data is written into the file system or read by the authorized process that issues the reading request. One example is for encrypting files accessed by Microsoft SQL Servers. Normally, Microsoft SQL Servers create and/or access a limited number of files, each of which is very large. In such a scenario, one encryption key can be secure enough to encrypt all the files accessed by Microsoft SQL Servers. Whenever Microsoft SQL Servers write data into a file, the filter 103 can use the single encryption key in the encryption key cache to encrypt the data before the data is written into the file system; whenever Microsoft SQL Servers read data from a file, the filter 103 can use the single encryption key in the encryption key cache to decrypt the data before the data is read by Microsoft SQL Servers.

The central sentry platform 140 can operate to monitor and manage each sentry 110. The central sentry platform 140 can include a controller 106, a collector 105, a web service 108, and a database 107. The controller 106 can send controlling and management information to the computer systems 10 to be executed or practiced by the sentries 110; the collector 105 can gather information from the sentries 110; the web service 108 can provide an interface for a user to interact with the data self-protection system 100 (e.g., to present data analysis and visualization results, or receive user inputs for control and management); and the database 107 can store various information, such as sentry records, controlling and management information, operational logs, etc.

The controller 106 can connect with the sentries 110 for software package delivery, software installation, activation, elevation, configuration, updating and license renewal, etc. The controller 106 can send various information to each sentry application 102 of each sentry 110. For example, the controller 106 can send a data self-protection policy to each sentry 110. In some embodiments, the controller 106 can configure the file system filter 103 of each sentry by sending a data self-protection policy to the sentry application 102.

In some embodiments, the controller 106 may be operate to perform software package delivery. For example, the controller 106 may take as inputs: the IP address, a valid port number, a valid user name, and the corresponding password of a computer system 10, which is to be protected by a sentry 110. The controller 106 may use services such as SSH on Linux or remote desktop on Windows to reach the computer system 10 for remote operations. The controller 106 may include scripting code, which can establish a control channel between the central sentry platform 140 and one or more sentries 110 to send a software package according to the operating system of the computer system 10. The controller 106 may automatically detect the operating system of the computer system 10 and deliver the proper software package. In some embodiments, scripts may be pushed over to be executed on a computer system 10 so that the computer system 10 may access a given file server to fetch a proper software package. In some embodiments, the controller 106 may receive the IP address, a valid port number, a valid user name, and the corresponding password as user inputs only once and create a dedicated user account for the computer system 10 for subsequent use. In some embodiments, the controller 106 may use a certificate to perform an automatic login.

In some embodiments, the controller 106 may contain scripting code for automatic installation of the software for a sentry 110 on a computer system 10. It may contain different set of codes for computer systems 110 of different operation systems, such as various Linux and Windows systems.

In some embodiments, the controller 106 may contain scripting code for automatic activation of the software for a sentry 110 on a computer system 10. The first execution of the installed software may trigger the generation of a unique number, which may be used to identify a computer system 10 in the central sentry platform 140. The automatic activation may involve obtaining the unique ID of a sentry 110, sending it back to the central sentry platform 140, generating an activation certificate on the central sentry platform 140, sending the activation certificate back to the sentry 110, and applying the activation certificate on the sentry 110.

In some embodiments, the controller 106 may be implemented by other programing languages other than the scripting code.

In some embodiments, the controller 106 may select a sentry 110 on a computer system 10 and conduct configuration of the sentry 110. This may involve establishing two lists, one for protected data files and the other one for authorized applications. These two lists may be included in the data self-protection policy. In some embodiments, establishing the list of protected files may be done on the central sentry platform 140 through a graphic user interface as part of the web service 108 and the controller 106. The web service component 108 can gather user inputs, pass them through the controller 106 to the sentry application 102 to be executed, obtain the feedback from the sentry application 102 and send them back to the controller 106, which can further present the feedback to the web service 108 to be displayed to the user.

In some embodiments, the controller 106 can manage the sentries 110 by performing package updating. In particular, the central sentry platform 140 may detect the version number of the current package installed on each sentry 110 and prompt an administrator to perform package updating, and help the administrator to carry out the updating. For example, package updating may be designed to support two types: the first type is a major update, which requires a system reboot and requires the supervision of an administrator; the second type is a minor update, which does not require a system reboot and thus can be conducted automatically and silently, without the attention of an administrator. In general, an update can be deemed as major if the file system filter 103 is updated, which is rare. In most cases, an update may only involve changes to the user mode application 101 and is minor.

In some embodiments, the controller 106 can manage the sentries 110 by performing license renewal. The license renewal can be initiated by an administrator, and carried out automatically by the central sentry platform 140, i.e., the controller 106 can push a renewal certificate to a corresponding sentry 110 and the central sentry platform 140 can carry out license renewal operations automatically.

The collector 105 can receive information from each sentry 110 to allow the central sentry platform 140 to monitor each sentry 110. The collector 105 may receive the information from the sentry application 102. For example, the collector 105 may receive information about data sentry records, including data accessing logs, system performance information, such as memory consumption, cpu usage, disk usage etc. The user-mode sentry application 102 can act as a bridge between the file system filter 103 and the collector 105 for logging data sentry information for data use monitoring and governance, as well as for logging the system performance information.

The collector 105 may receive information regarding access to the encrypted data stored on each computer system 10 having a sentry 110 installed thereon. For example, the collector 105 may receive information on each access request examined by each sentry 110. In some embodiments, the information may include for each access request made by each process, information on the computer system 10, information on the process including its application program, file information of the encrypted data, the time of access of the attempt, and the examination result.

For example, the information may include sentry records that include a time series of events of applications that are permitted to access protected data files or applications that are blocked from accessing protected data files. These records may also contains detailed information of each computer system 10, such as the name, its IP address, and a time stamp. These records can be generated by the file system filter 103 on each computer system 10. The records may be in their original format, or may be compressed, partially or as a whole, for better processing efficiency. In some embodiments, the protected file names and the application names may be replaced with hash values as a partial compression solution to save disk space. In some other embodiments, the whole record of a specific application accessing a given data file on a computer system 10 with a known IP may be recorded as a dictionary entry and all its repetitions may be recorded as an index in the dictionary.

In some embodiments, information collected by the collector 105 may further include details of all running processes, or some specific processes, regardless of whether they are accessing protected files or not. This information may be used to better understand the computing performance of the corresponding computer system 10. E.g., it may be used to detect malware that are draining the system resources, such as some mining robots.

The collector 105 may also receive information from each sentry 110 regarding the operational aspects of the corresponding computer system 10 so that the central sentry platform 140 can monitor operational aspects of each computer system 10. For example, the operational aspects of each computer system 10 can include operational statistics related to the resources of that computer system 10. In some embodiments, the operational aspects may include the current usage level of each resource relative to the total capacity of that resource. For instance, the resources may include a memory, a processor, and a disk space of the computer system 10.

In some embodiments, the information may include system information about each computer system 10, such as the CPU usage, memory consumption, and the disk usage, etc. The information may be collected using various methods, e.g., API calls or system utilities, on the computer systems 10. In some embodiments, the CPU usage, the memory consumption and the disk usage can be represented by three integers indicating the percentage varying from 0 to 100. Without compromising much security and reliability, the precision of these values may be further reduced for better storage efficiency, e.g., to quantize these values as to map the percentage to a range of 0 to 50. In some embodiments, the CPU usage at each time instance for each computer system 10 may be recorded as an array of percentages that correspond to multiple cores. In some embodiments, the disk usage for each computer system 10 may be recorded as an array of percentages that correspond to multiple disks or partitions.

In some embodiments, the operational aspects may include the system vitality of a computer system 10. The system vitality may be calculated based on various system parameters, such as the instantaneous CPU usage, the instantaneous memory usage, the disk space, etc. For example, the system vitality sv may be computed as:

```
If(MemUsePer>0.95||CpuUsePer>0.95||DiskUsePer>0.95)
    sv = 0 ;
else
    sv = 1 - (MemUsePer + CpuUsePer + DiskUsePer)/3 ;
``` where MemUsePer, CpuUsePer, DiskUsePer stands for the percentage of used memory, the percentage of used CPU, and the percentage of used disk space, respectively.

In some embodiments, the operational aspects may include an average payload mutation index. The average payload mutation index may indicate the average of a sudden change of file accessing activities by an authorized application to protected files, which are permitted by the file system filter 103. For example, the index may be defined as follows:

LoadIndex=(CCFA/CTI)/(TCFA/ETW)

Where CCFA is the current count of file access in the given time interval, CTI is the length of the current time interval in minutes, TCFA is the total count of file access in an extended time window, and ETW is the length of the extended window in minutes. For the extended time window, it is usually selected as a larger time window that encloses the current time interval, e.g., to extend the left margin of the current time interval by a given number of minutes earlier up to the earliest time in the system and to extend the right margin of the current time interval by a given number of minutes later up to the latest time in the system. In some embodiments, the count of file access may refer to the accessing by authorized applications to the protected data files that will be permitted by the file system filter 103. In this case, the resulting index is defined as a payload index. In some embodiments, the arithmetic average of those payload indexes from multiple sentries may be computed as an average payload mutation index. In some embodiments, the file access count may be collected for all protected data files being accessed, including those being permitted from authorized applications and those being blocked from unauthorized applications. In this case, the resulting load index carries a meaning of the overall load mutation index. In some embodiments, the files access count may be collected for all protected data files being accessed by only those unauthorized applications. In this case, all accesses will be blocked by the file system driver. The resulting index may be named as hack mutation index. The sudden change of this hack index may suggest a virus outburst.

In some embodiments, each sentry 110 can send a time series of heartbeats to the central sentry platform 140. The time series of heartbeats can be encrypted so that it can only be modified by the sentry 110. The encryption may prevent a user with root, administrative, or supervisor level access to the computer system 10 from modifying the time series of heartbeats. The time series of heartbeats may be sent via the communication channel linking the central sentry platform 140 to the file system filter 103 via the sentry application 102. The central sentry platform 140 may monitor the time series of heart beats to evaluate the status of that sentry 110. The time series of heartbeats can be defined as a regular signal that is generated by each sentry 110 and is sent to the central sentry platform 140 for indicating whether the sentry 110 is functioning properly. When hacking occurs and the data self-protection system 100 is under attack, the central sentry platform 140 may deduce from the heartbeat signals about whether the protection system 100 has been compromised or not. The heartbeat information may be recorded and stored in its original format as a regular signal received at a regular time interval. For better storage efficiency, it may be converted to a run-length code, or a sequence of starting and stopping time instances of normal heartbeat signals.

In some embodiments, the communications between the sentry applications 102 and the collector 105 may be based on a standard format for easy exchange of information and good extensibility, such as the Extensible Markup Language (XML). The collector 105 may include a XML parser to extract all information received from the sentry applications 102 and store them in the database 107 in its original format or in a new format for better data visualization and/or analysis. In other embodiments, the communication between the sentry applications 102 and the collector 105 may be based on any specific format agreed between the sender and the receiver.

In some embodiments, the collector 105 may behave as an http server that listens to a specific port at a given IP address that can be accessed from all of the computer systems 10. Connections between the sentry applications 102 and the collector 105 may be initiated by the sentry applications 102. In other embodiments the collector 105 may behave as an http client that polls all sentry applications 102 for new information. This may be particularly needed when the central sentry platform 140 is installed on a computer whose IP address is not directly accessible by the computer systems 110 while the computer systems 110 are equipped with IP addresses that are directly accessible by the central sentry platform 140.

The database 107 can store the various information collected by the collector 105 or to be sent by the controller 106. For example, the database 107 may store the sentry records, operational aspects, and heartbeat information received by the collector 105. In another example, the database 107 may store the data self-protection policies to be sent to the sentries 110.

In some embodiments, InfluxDB may be used to store time series, such as the heartbeats and/or the system information, such as CPU usage, memory consumption, disk usage etc. Such high frequency and low retention period information may be well suited for InfluxDB due to its fast insertion and searching.

In some embodiments, ElasticSearch may be used to store the sentry records of some applications accessing protected files. ElasticSearch may be well suited for low frequency and long retention period information, and may allow for document style recording.

In some embodiments, a non-time-series database may be used to store the information that is collected from the sentries 110 with an appropriate schema design. For example, the heartbeat data may be stored using a double-columns schema to record only periods with consecutive heartbeats, where the first column is an index indicating the starting time and the second column is an index indicating the ending time. When a new heartbeat signal is received, the difference between the current time and the ending period in the last row can be compared against the predefined time interval. If the difference exceeds certain threshold (e.g., two times the regular time interval), the ending period in the last row can be updated to the current time. Otherwise, a new row can be inserted using the current time as the starting time and the ending time. In some embodiments, the heartbeat data may include the time variation and the channel delay. In some embodiments, the system information may be recorded in a four-column schema, containing one column of a time index plus three columns, each being a byte indicating the percentage of CPU usage, memory consumption and disk usage respectively.

The web service 108 can provide various interfaces for a user to interact with the central sentry platform 140. For example, the web service 108 may provide an interface that allows a user to change the access permission for processes in the data self-protection policy. The web service 108 may also provide a visualization display to display various data collected by the central sentry platform 140. For example, the web service 108 may generate various graphic components for visualizing the overall status for the computer systems 10 on which the sentries 110 are installed, such as the system vitality, the CPU usage, the memory usage, the disk space, heartbeat, etc. The graphic components may also visualize the data sentry records and their derived information, including the payload mutation index, the overall load mutation index, the hack mutation index, etc.

The web service 108 can query the database 107 to generate the graphic components. In some embodiments, for balancing the efficiency of recording raw information from the sentries 110 and querying databases 107 for visualization, a separate service may be established to extract raw information and generate derived information and store derived information into database tables.

In some embodiments, the visualization display can display indicators that display information associated with the information received from the sentries 110. For example, the web service 108 may provide a plurality of operational status indicators that indicate the operational aspects received from the sentries 110. In another example, the web service 108 may provide a plurality of access status indicators that indicate the examined access requests received from the sentries 110.

In some embodiments, the visualization display can display a plurality computer representations. Each computer representation can correspond to one of the computer systems 110 having a sentry installed thereon. Each computer representation can be provided in association with one or more indicators that display information received from the sentry 110 installed on the respective computer system 10. For example, each computer representation can be provided in association with one or more operational status indicators or access status indicators associated with the respective computer system 10.

In some embodiments, the visualization display can indicate the overall health for all sentries 110 and all the computer systems 10 where the sentries 110 are installed and guarding. The visualization display may contain graphical illustrations of the overall evaluation of how many computer systems 10 are healthy, how many are not healthy, and how many are on the boundary according to certain criteria, such as to apply a threshold to the system vitality.

In some embodiments, the visualization display can indicate the average system vitality for all computer systems 10 that are protected by the sentries 110. The visualization display may contain a graphical illustration of the average system vitality as described above.

In some embodiments, the visualization display may include a graphical illustration of the overall load mutation index and/or the payload mutation index. The illustration may use colors or other visual elements such as circles with various radius. For example, the visual elements may be used to indicate various types of statuses, e.g., normal, abnormal, and a status in the middle. In some embodiments, the visualization may be customized using various time periods, e.g., for the most recent 24 hours, or the most recent 7 days, or the most recent 30 days, or the most recent 12 months. The time periods can present an overall image of the information received from the sentries on the computer systems 110, over different periods of time.

In some embodiments, the visualization display can display the status of each computer system 10, which may include the health of the computer system 10, the information received from the computer system 10, statistics of the protected files stored on the computer system 10, etc. The visualization display may provide an overall image of the information received from computer system 10 and the system health of the computer system 10. For example, the visualization display may include a color map that represents the health status of a particular computer system 10 over a particular period of time. For instance, the time period may be one year. Each pixel in the color map can be a particular color representing a particular status of the computer system 10. For instance, the pixels may be R (pure red), B (pure blue), and G (pure green), e.g., representing three stages of a system resource as running out, fairly sufficient, and abundant, where related resources may be the CPU usage, memory usage, disk space, etc. In another example, the color pixels may be used to represent a derived system parameter, such as the system vitality. In another example, a color map may be established by multiplying each proportion of the CPU usage percentage, the memory usage percentage and the disk usage percentage by 255 and associating them with pure green G, pure red R, and pure blue B. As such, the health of the system at each moment can be represented by a color pixel. When all the proportions are close to 1, the color may be close to pure white, indicating that the machine is likely to crash. The resolution of the color map can depend on the sampling frequency. For instance, if sampling is done every minute, 365 days a year, then the size of the color map may be 1440×365. Each row can represent the health of the day, and each column can represent the health of the day at different times. In some embodiments, a video clip of multiple color maps may be generated to represent the health of multiple computer systems 10.

In some embodiments, the central sentry platform 140 can provide a dynamic search function. The dynamic search function can facilitate searching items contained in the information received from the sentries 110. For example, the dynamic search function may be used to search the examined access requests received from the sentries 110. The dynamic search function may be used to explore various raw information, such as file access records and derived information, such as the load index, that are collected and accumulated on the central sentry platform 140, to further facilitate data analysis by a system administrator.

In some embodiments, the search condition may be grouped into two major categories. The first category is for data file accessing activities, which may contain the data accessing time, the computer system name, the operating system of the computer system, the ID of the group to which the computer system belongs to, the IP address of the computer system, the full path of the targeted file, the application, and the final decision by the file system filter 103 as to permit or to block the file access. The second category may be the computer system status, including the computer system health, the computer system ID in the system, the ID of the group to which this computer system belongs, the system vitality of this computer system, the CPU usage, the memory usage, the disk space, the registration time of the computer system, etc.

In some embodiments, the dynamic search function may first present all conditions to the end user, while automatically checking the logical relationship of all selected conditions, and progressively enable/disable some conditions for the best user experience.

In some embodiments, the search function may contain a flexible method of displaying the search results for the file access records. For example, the results may be presented as tables with columns that can be selected by the end user to be included or to be excluded, such as the recording time, the computer system name, the protected file path, the application, the operating system, the IP address, etc. In another exemplary embodiment, the results may be presented as graphics such as a bar chart for the data sentry records, a bar chart of data self-protection as details of protected files, such as the number of files and the types of files that have been protected, a bar chart of the overall load mutation index, the payload mutation index and the attack mutation index, etc.

In some embodiments, the search function may contain a flexible method of displaying the search results for the computer system status. For example, the results may be presented as tables with columns that can be selected by the end user to be included or to be excluded, such as the computer system health, the computer system name, the group ID, the heartbeat status, the computer system vitality, the CPU usage, the memory usage, the disk space, the computer system registration time, the operating system, IP address, etc. In another embodiment, the results may be presented as graphics such as a triangle for the computer system information as the CPU usage, the memory usage, and the disk space, or a heartbeat chart, etc.

In some embodiments, the central sentry platform 140 can collect and record every operation by an administrator user, e.g., viewing sentry records and/or computer system status, conducting dynamic searches, registering a sentry 110 on a new computer system 10, activating a sentry 110 on a new computer system 10, configuring a sentry 110 on a computer system 10 for creating a protection zone of data files, configuring a sentry 110 on a computer system 10 for granting an application the permission to access protected data files, etc. In some embodiments, all operations may be recorded permanently, meaning the system 100 may not support updating or deletion of those records once they are generated, leading to a comprehensive set of file accessing logs for all data protected by all sentries 110 and all visualization, monitoring and management operations on these sentries 110 by the system administrators. This may lay a solid foundation for forensic analysis, involving in establishing the evidence of a hack or a hacking attempt, finding the vulnerability in the system 100, and tracking/monitoring the activities of the system administrators, etc.

In some embodiments, the central sentry platform 140 can generate statistic reports of data sentry information and computer system status information, which may be used by various departments and/or personnel in an organization as a data security report.

Figure 3:
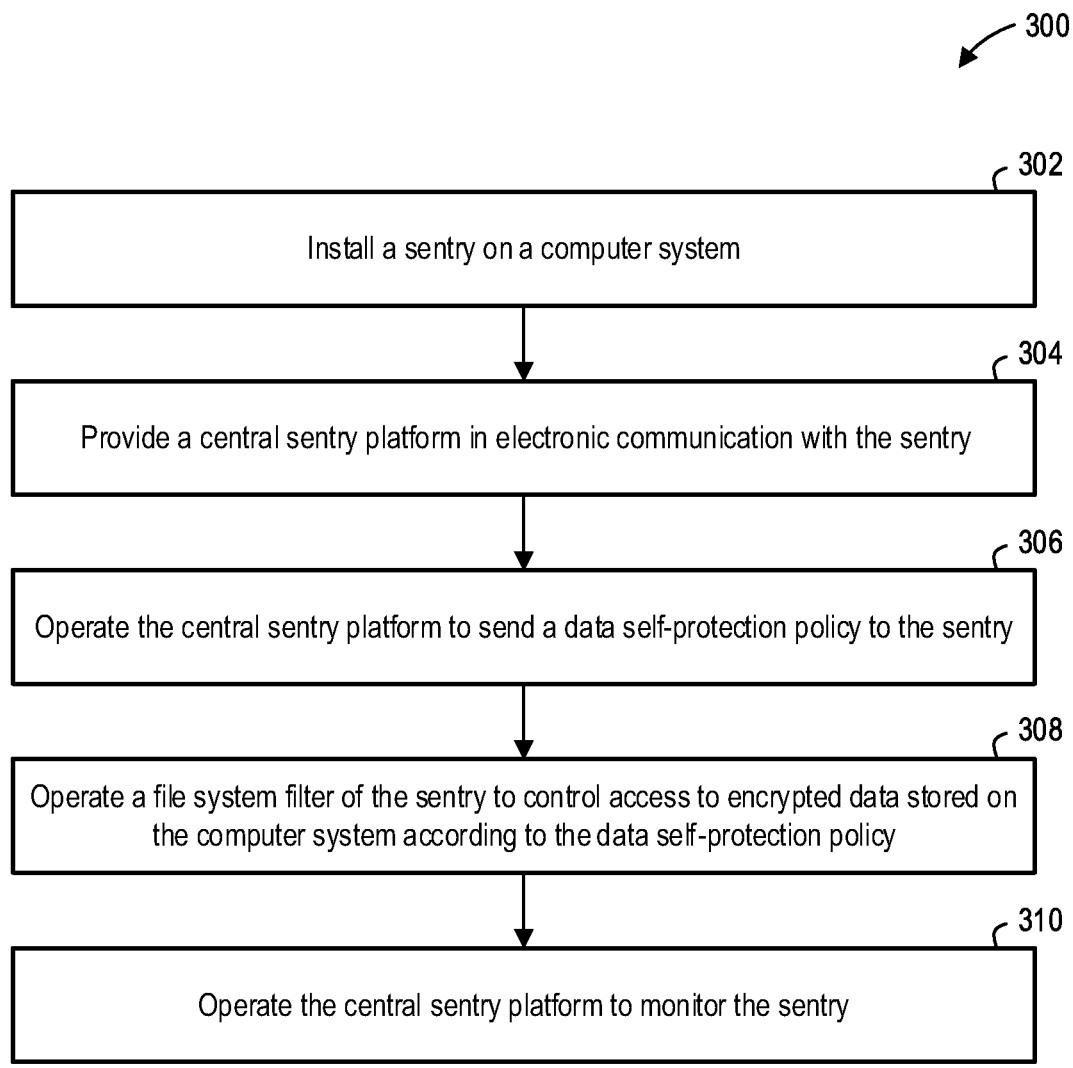
FIG. 3 is a flowchart of an example method for enabling data self-protection, in accordance with an embodiment.

Referring now to FIG. 3, there is shown an example method 300 for enabling data self-protection, in accordance with an embodiment. In some embodiments, the data self-protection method 300 may be implemented using the data self-protection system 100.

At 302, a sentry 110 is installed on a computer system 10. For example, a file system filter 103 can be installed in the kernel of the computer system 10, and a sentry application 102 can be installed in the user space 120 of the computer system. The sentry 110 can encrypt and control access to data stored on the computer system 10. In some embodiments, a plurality of sentries 110 can be installed on a plurality of computer systems 10, with each sentry 110 being installed on a different computer system 10.

At 304, a central sentry platform 140 is provided in communication with the sentry 110. For example, the central sentry platform 140 can include a collector 105 for receiving data from the sentry 110 and a controller 106 for sending data to the sentry 110. In some embodiments, the central sentry platform 140 can be connected to each sentry in the plurality of sentries 110.

At 306, the central sentry platform 140 is operated to send a data self-protection policy to the sentry 110. For example, the central sentry platform 140 can operate the controller 106 to send a list of applications 101 authorized to access plaintext content of the encrypted data stored on the computer system 10, and a list of applications 101 authorized to access cipher-text content of the encrypted data stored on the computer system 10. In some embodiments, the central sentry platform 140 can send a data self-protection policy to each sentry 110 in the plurality of sentries.

At 308, the file system filter 103 is operated to control access to the encrypted data stored on the computer system 10 according to the data self-protection policy. For example, the file system filter 103 can handle each file access request made by a process, and grant or deny the file access request according to the data self-protection policy. For instance, the file system filter 103 may determine whether the application associated with the process making the file access request is permitted to access plain-text content, cipher-text content, or neither. In some embodiments, each file system filter 103 of each sentry 110 in the plurality of sentries 110 can control access to the encrypted data stored on the respective computer system 10.

At 310, the central sentry platform 140 is operated to monitor the sentry 110. For example, the central sentry platform 140 may receive at the collector 105 information from the sentry 110 regarding access to the encrypted data stored on the computer system 10. In another example, the central sentry platform 140 may receive at the collector 105 information from the sentry 110 regarding operational aspects of the computer system 10. In some embodiments, the central sentry platform 140 can monitor each sentry 110 in the plurality of sentries 110.

A number of example embodiments have been described herein. However, it will be understood by persons skilled in the art that other variations and modifications may be made without departing from the scope of the embodiments as defined in the claims appended hereto.

The invention claimed is:

1. A method of enabling data self-protection on at least one computer system, the method comprising:
   installing a sentry on a computer system of the at least one computer system, wherein the sentry comprises a file system filter installed on a kernel of that computer system, the file system filter integrating mandatory access control and encryption together;
   providing a central sentry platform in electronic communication with the sentry installed on the computer system, the central sentry platform being separate from the kernel of the computer system;
   operating the central sentry platform to send a data self-protection policy to the sentry, the data self-protection policy being encrypted so that the data self-protection policy can only be modified by the central sentry platform;
   operating the file system filter to control access to encrypted data stored on the computer system, by, for each process making a file access request to the encrypted data, the file system filter receiving and handling that file access request according to the data self-protection policy to grant or deny that file access request; and,
   operating the central sentry platform to monitor the sentry and to receive information from the sentry regarding access to the encrypted data stored on the computer system.

2. The method as defined in claim 1 wherein
   the at least one computer system comprises a plurality of computers;
   installing the sentry comprises installing a plurality of sentries including, for each computer in the plurality of computers, installing a corresponding sentry on that computer, wherein installing that corresponding sentry on that computer comprises installing the file system filter of that corresponding sentry on the kernel of that computer;
   providing the central sentry platform comprises providing the central sentry platform on a central sentry computer system in electronic communication with the plurality of sentries;
   operating the central sentry platform to send the data self-protection policy comprises operating the central sentry platform to send a plurality of data self-protection policies including, for each sentry in the plurality of sentries, sending a corresponding data self-protection policy to that sentry;
   operating the file system filter to control access to encrypted data stored on the computer system, comprises, for each computer in the plurality of computers, operating the file system filter of the corresponding sentry installed on that computer to control access to the encrypted data stored on that computer according to the corresponding data self-protection policy sent to the corresponding sentry; and,
   operating the central sentry platform to monitor the sentry comprises, for each computer in the plurality of computers, operating the central sentry platform to monitor the corresponding sentry on that computer to receive information from that sentry regarding access to the encrypted data stored on that computer.

3. The method as defined in claim 2 wherein,
   for each computer in the plurality of computers, operating the file system filter of the corresponding sentry installed on that computer further comprises operating the file system filter to examine each access request made by each process to access the encrypted data stored on that computer according to the corresponding data self-protection policy sent to that sentry by
      granting the access request and decrypting the encrypted data based on plaintext access being allowed by the corresponding data self-protection policy,
      granting the access request without decrypting the encrypted data based on cipher-text access being allowed by the corresponding data self-protection policy, and
      denying the access request based on neither plaintext access nor cipher-text access being allowed by the corresponding data self-protection policy; and
   operating the central sentry platform to monitor each sentry in the plurality of sentries to receive information from that sentry further comprises monitoring each sentry to receive information on all examined access requests from that sentry.

4. The method as defined in claim 3, wherein information on all examined access requests comprises, for each access request made by each process on each computer in the plurality of computers, information of that computer, information of that process including its application program, file information of the encrypted data, a time of access attempt associated with that access request, and an examination result made by the corresponding sentry on that computer.

5. The method as defined in claim 4 further comprises providing a visualization display, associated with the central sentry platform, to display a plurality of access status indicators for indicating and displaying the information on all examined access requests received from the plurality of sentries.

6. The method as defined in claim 5, wherein providing the visualization display comprises
   providing on the visualization display a plurality of computer representations comprising, for each computer in the plurality of computers, a corresponding computer representation for representing that computer; and,
   for each computer representation provided on the visualization display, providing in association with that computer representation, at least one access status indicator in the plurality of access status indicators to display and indicate at least partial information on all examined access requests received from the corresponding sentry on the computer represented by that computer representation.

7. The method as defined in claim 4 further comprises providing at the central sentry platform a dynamic search function for searching items contained in the information on all examined access requests received from the plurality of sentries.

8. The method as defined in claim 3 further comprises,
for each computer in the plurality of computers, operating the corresponding sentry installed on that computer to monitor operational aspects of that computer in addition to examining all access requests to access the encrypted data stored on that computer;
wherein, for each computer in the plurality of computers, operating the central sentry platform to monitor each sentry further comprises operating the central sentry platform to receive information from that sentry regarding the operational aspects of that computer.

9. The method as defined in claim 8 wherein, for each computer in the plurality of computers,
the operational aspects of that computer comprise, for a plurality of resources of that computer, a current usage level of each resource in the plurality of resources relative to a total capacity of that resource on that computer;
wherein the plurality of resources comprises a memory, a processor and disk space of that computer.

10. The method as defined in claim 9 further comprise providing a visualization display, associated with the central sentry platform, to display a plurality of operational status indicators for indicating and displaying the operational aspects received from the plurality of sentries.

11. The method as defined in claim 10, wherein providing the visualization display comprises
providing on the visualization display a plurality of computer representations comprising for each computer in the plurality of computers, a corresponding computer representation for representing that computer; and
for each computer representation provided on the visualization display, providing in association with that computer representation, at least one operational status indicator in the plurality of operational status indicators to display and indicate at least one operational aspect received from the corresponding sentry on the computer represented by that computer representation.

12. The method as defined in claim 3 wherein, for each computer in the plurality of computers,
the data self-protection policy sent to the corresponding sentry installed on that computer comprises a plaintext authorization list of all legitimate application programs having processes authorized to access plaintext content of the encrypted data, and a cipher-text authorization list of all legitimate application programs having processes authorized to access cypher-text content of encrypted data;
for each access request to access the encrypted data, the file system filter of that sentry determines
plaintext access is allowed when the process making the access request is authenticated by that sentry as a process of a legitimate application program listed on the plaintext authorization list,
cipher-text access is allowed when the process making the access request is authenticated by that sentry as a process of a legitimate application program listed on the cipher-text authorization list, and
otherwise neither plaintext access nor cipher-text access is allowed.

13. The method as defined in claim 12 wherein, for each computer in the plurality of computers, installing the corresponding sentry on that computer further comprises
installing a sentry application of that sentry on a user space of that computer, the user space being separate from the kernel space of that computer, the sentry application of that sentry being linked for communication with the file system filter of that sentry; and,
providing a plurality of communication channels, wherein the plurality of communication channels comprises, for each computer in the plurality of computers, a communication channel linking the central sentry platform to the file system filter of the sentry for that computer via the sentry application of the sentry for that computer.

14. The method as defined in claim 13 further comprising, for each sentry in the plurality of sentries,
defining a heartbeat frequency;
operating that sentry to send a time series of heartbeats to the central sentry platform at the heartbeat frequency via the communication channel linking the central sentry platform to the file system filter of that sentry, the time series of heartbeats being encrypted so that the time series of heartbeats can only be modified by that sentry;
monitoring the time series of heartbeats; and,
based at least partly on the monitoring the time series of heartbeats, operating the central sentry platform to evaluate a status of that sentry.

15. A system for enabling data self-protection, the system comprising:
at least one computer system, wherein a computer system of the at least one computer system comprises a processor, the computer system has a sentry installed thereon, the sentry comprising a file system filter installed on a kernel of that computer system, the file system filter integrating mandatory access control and encryption together; and,
a central sentry platform in electronic communication with the sentry installed on the computer system, the central sentry platform being separate from the kernel of the computer system;
wherein, in operation:
the central sentry platform sends a data self-protection policy to the sentry, the data self-protection policy being encrypted so that the data self-protection policy can only be modified by the central sentry platform;
the file system filter controls access to encrypted data stored on the computer system, by, for each process making a file access request to the encrypted data, the file system filter receiving and handling that file access request according to the data self-protection policy to grant or deny that file access request;
the central sentry platform monitors the sentry and receives information from the sentry regarding access to the encrypted data stored on the computer system.

16. The system as defined in claim 15 wherein
the at least one computer system comprises a plurality of computers;
each computer in the plurality of computers has corresponding sentry installed thereon, wherein the file system filter of that corresponding sentry is installed on the kernel of that computer;
the central sentry platform is provided on a central sentry computer system in electronic communication with the plurality of sentries;
the central sentry platform is operable to send a plurality of data self-protection policies including, for each sentry in the plurality of sentries, a corresponding data self-protection policy for that sentry;

for each computer in the plurality of computers, the file system filter of the corresponding sentry installed on that computer is operable to control access to the encrypted data stored on that computer according to the corresponding data self-protection policy sent to the corresponding sentry; and, the central sentry platform is operable to, for each computer in the plurality of computers, monitor the corresponding sentry on that computer to receive information from that sentry regarding access to the encrypted data stored on that computer.

17. The system as defined in claim 16 wherein,
for each computer in the plurality of computers, the file system filter of the corresponding sentry installed on that computer is operable to examine each access request made by each process to access the encrypted data stored on that computer according to the corresponding data self-protection policy sent to that sentry by
   granting the access request and decrypting the encrypted data based on plaintext access being allowed by the corresponding data self-protection policy,
   granting the access request without decrypting the encrypted data based on cipher-text access being allowed by the corresponding data self-protection policy, and
   denying the access request based on neither plaintext access nor cipher-text access being allowed by the corresponding data self-protection policy; and
the central sentry platform is operable to monitor each sentry to receive information on all examined access requests from that sentry.

18. The system as defined in claim 17 wherein the information on all examined access requests comprises, for each access request made by each process on each computer in the plurality of computers, information of that computer, information of that process including its application program, file information of the encrypted data, a time of access attempt associated with that access request, and an examination result made by the corresponding sentry on that computer.

19. The system as defined in claim 18 wherein the central sentry platform is operable to provide a visualization display to display a plurality of access status indicators for indicating and displaying the information on all examined access requests received from the plurality of sentries.

20. The system as defined in claim 19, wherein providing the visualization display comprises
   providing on the visualization display a plurality of computer representations comprising, for each computer in the plurality of computers, a corresponding computer representation for representing that computer; and,
   for each computer representation provided on the visualization display, providing in association with that computer representation, at least one access status indicator in the plurality of access status indicators to display and indicate at least partial information on all examined access requests received from the corresponding sentry on the computer represented by that computer representation.

21. The system as defined in claim 18 wherein
the central sentry platform is operable to provide a dynamic search function for searching items contained in the information on all examined access requests received from the plurality of sentries.

22. The system as defined in claim 17, wherein
for each computer in the plurality of computers, the corresponding sentry installed on that computer is operable to monitor operational aspects of that computer in addition to examining all access requests to access the encrypted data stored on that computer; and,
the central sentry platform is operable to, for each computer in the plurality of computers, receive information from the corresponding sentry regarding the operational aspects of that computer.

23. The system as defined in claim 22, wherein, for each computer in the plurality of computers,
   the operational aspects of that computer comprise, for a plurality of resources of that computer, a current usage level of each resource in the plurality of resources relative to a total capacity of that resource on that computer;
   wherein the plurality of resources comprises a memory, a processor and disk space of that computer.

24. The system as defined in claim 23 wherein the central sentry platform is operable to provide a visualization display to display a plurality of operational status indicators for indicating and displaying the operational aspects received from the plurality of sentries.

25. The system as defined in claim 24, wherein providing the visualization display comprises
   providing on the visualization display a plurality of computer representations comprising for each computer in the plurality of computers, a corresponding computer representation for representing that computer; and,
   for each computer representation provided on the visualization display, providing in association with that computer representation, at least one operational status indicator in the plurality of operational status indicators to display and indicate at least one operational aspect received from the corresponding sentry on the computer represented by that computer representation.

26. The system as defined in claim 17 wherein for each computer in the plurality of computers,
   the data self-protection policy sent to the corresponding sentry installed on that computer comprises a plaintext authorization list of all legitimate application programs having processes authorized to access plaintext content of the encrypted data, and a cipher-text authorization list of all legitimate application programs having processes authorized to access cypher-text content of encrypted data;
   for each file access request to access the encrypted data, the file system filter of that sentry determines
      plaintext access is allowed when the process making the access request is authenticated by that sentry as a process of a legitimate application program listed on the plaintext authorization list,
      cipher-text access is allowed when the process making the access request is authenticated by the sentry as a process of a legitimate application program listed on the cipher-text authorization list, and
      otherwise neither plaintext nor cipher-text access is allowed.

27. The system as defined in claim 26 wherein,
for each computer in the plurality of computers, a sentry application of that sentry is installed on a user space of that computer, the user space being separate from the kernel space of that computer, the sentry application of that sentry being linked for communication with the file system filter of that sentry; and, the system further comprises a plurality of communication channels, wherein the plurality of communication channels comprises, for each computer in the plurality of computers, a communication channel linking the central sentry platform to the file system filter of the sentry for that computer via the sentry application of the sentry for that computer.

28. The system as defined in claim 27 wherein, for each sentry in the plurality of sentries,
the sentry is operable to send a time series of heartbeats to the central sentry platform at a heartbeat frequency via the communication channel linking the central sentry platform to the file system filter of that sentry, the time series of heartbeats being encrypted so that the time series of heartbeats can only be modified by that sentry;
the central sentry platform is operable to monitor the time series of heartbeats; and,
the central sentry platform is operable to, based at least partly on the monitoring the time series of heartbeats, evaluate a status of that sentry.

* * * * *